(12) United States Patent
Zheng et al.

(10) Patent No.: US 11,792,003 B2
(45) Date of Patent: Oct. 17, 2023

(54) DISTRIBUTED STORAGE SYSTEM AND METHOD OF REUSING SYMMETRIC KEYS FOR ENCRYPTED MESSAGE TRANSMISSIONS

(71) Applicant: VMware, Inc., Palo Alto, CA (US)

(72) Inventors: Haoran Zheng, San Jose, CA (US); Tao Xie, Shanghai (CN); Wei Fang, Shanghai (CN); Anil Chintalapati, Fremont, CA (US); Jing Liu, Redwood City, CA (US)

(73) Assignee: VMWARE, INC., Palo Alto, CA (US)

( * ) Notice: Subject to any disclaimer, the term of this patent is extended or adjusted under 35 U.S.C. 154(b) by 379 days.

(21) Appl. No.: 16/950,852

(22) Filed: Nov. 17, 2020

(65) Prior Publication Data
US 2022/0103359 A1    Mar. 31, 2022

(30) Foreign Application Priority Data
Sep. 29, 2020  (WO) .............. PCT/CN2020/118722

(51) Int. Cl.
*H04L 9/14*  (2006.01)
*G06F 9/54*  (2006.01)
*H04L 9/32*  (2006.01)
*H04L 101/622*  (2022.01)

(52) U.S. Cl.
CPC .............. *H04L 9/14* (2013.01); *G06F 9/545* (2013.01); *H04L 9/32* (2013.01); *H04L 2101/622* (2022.05)

(58) Field of Classification Search
CPC ....... H04L 9/14; H04L 9/32; H04L 2101/622; H04L 9/0844; H04L 9/0891; H04L 9/3242; H04L 9/0894; G06F 9/545
See application file for complete search history.

(56) References Cited

U.S. PATENT DOCUMENTS

| | | | |
|---|---|---|---|
| 9,148,446 B2 * | 9/2015 | Kelson ............... | H04L 63/20 |
| 2013/0094650 A1 * | 4/2013 | Mendel ............... | H04L 9/3215 380/255 |
| 2014/0082359 A1 * | 3/2014 | Nakhjiri ............. | H04L 9/3066 713/168 |
| 2018/0287796 A1 * | 10/2018 | Peper ................. | H04L 9/3242 |

* cited by examiner

*Primary Examiner* — Abiy Getachew
(74) *Attorney, Agent, or Firm* — LOZA & LOZA, LLP

(57) ABSTRACT

Distributed storage system and method for transmitting storage-related messages between host computers in a distributed storage system uses a handshake operation of a first-type communication connection between a source data transport daemon of a source host computer and a target data transport daemon of a target host computer to derive a symmetric key at each of the source and target data transport daemons. The two symmetric keys are sent to a source data transport manager of the source host computer and to a target data transport manager of the target host computer. The source and target data transport managers then use the same symmetric keys to encrypt and decrypt storage-related messages that are transmitted from the source data transport manager to the target data transport manager through multiple second-type communication connections between the source and target data transport managers.

20 Claims, 7 Drawing Sheets

DISTRIBUTED STORAGE SYSTEM AND METHOD OF REUSING SYMMETRIC KEYS FOR ENCRYPTED MESSAGE TRANSMISSIONS

CROSS-REFERENCE TO RELATED APPLICATIONS

The present application for Patents claims priority to PCT International Application No. PCT/CN2020/118722, filed Sep. 29, 2020, which is incorporated by reference herein in its entirety.

BACKGROUND

A distributed storage system allows a cluster of host computers to aggregate local storage devices, which may be located in or attached to each host computer, to create a single and shared pool of storage. This pool of storage is accessible by all host computers in the cluster, including any virtualized instances running on the host computers, such as virtual machines. Because the shared local storage devices that make up the pool of storage may have different performance characteristics, such as capacity, input/output per second (IOPS) capabilities, etc.), usage of such shared local storage devices to store data may be distributed among the virtual machines based on the needs of each given virtual machine.

This approach provides enterprises with cost-effective performance. For instance, distributed storage using pooled local storage devices is inexpensive, highly scalable, and relatively simple to manage. Because such distributed storage can use commodity storage devices, e.g., disk drives, in the cluster, enterprises do not need to invest in additional storage infrastructure.

However, one issue that arises with this approach is that a distributed storage system may have a vast number of Transmission Control Protocol (TCP) connections for data streams among different host computers in a cluster. At any moment, there could be a significant number of connections created and closed. If a cryptographic protocol, such as Transport Layer Security (TLS) protocol, is used for the connections, there would be significant overhead to go through the required handshake to generate keys for each connection, which has to be repeated when an existing key is rotated after certain number of messages transferred or after certain time interval. In addition, due to the large number of connections, managing so many keys in memory will require significant amount of resources.

BRIEF DESCRIPTION OF THE DRAWINGS

Throughout the description, similar reference numbers may be used to identify similar elements.

DETAILED DESCRIPTION

Figure 1:
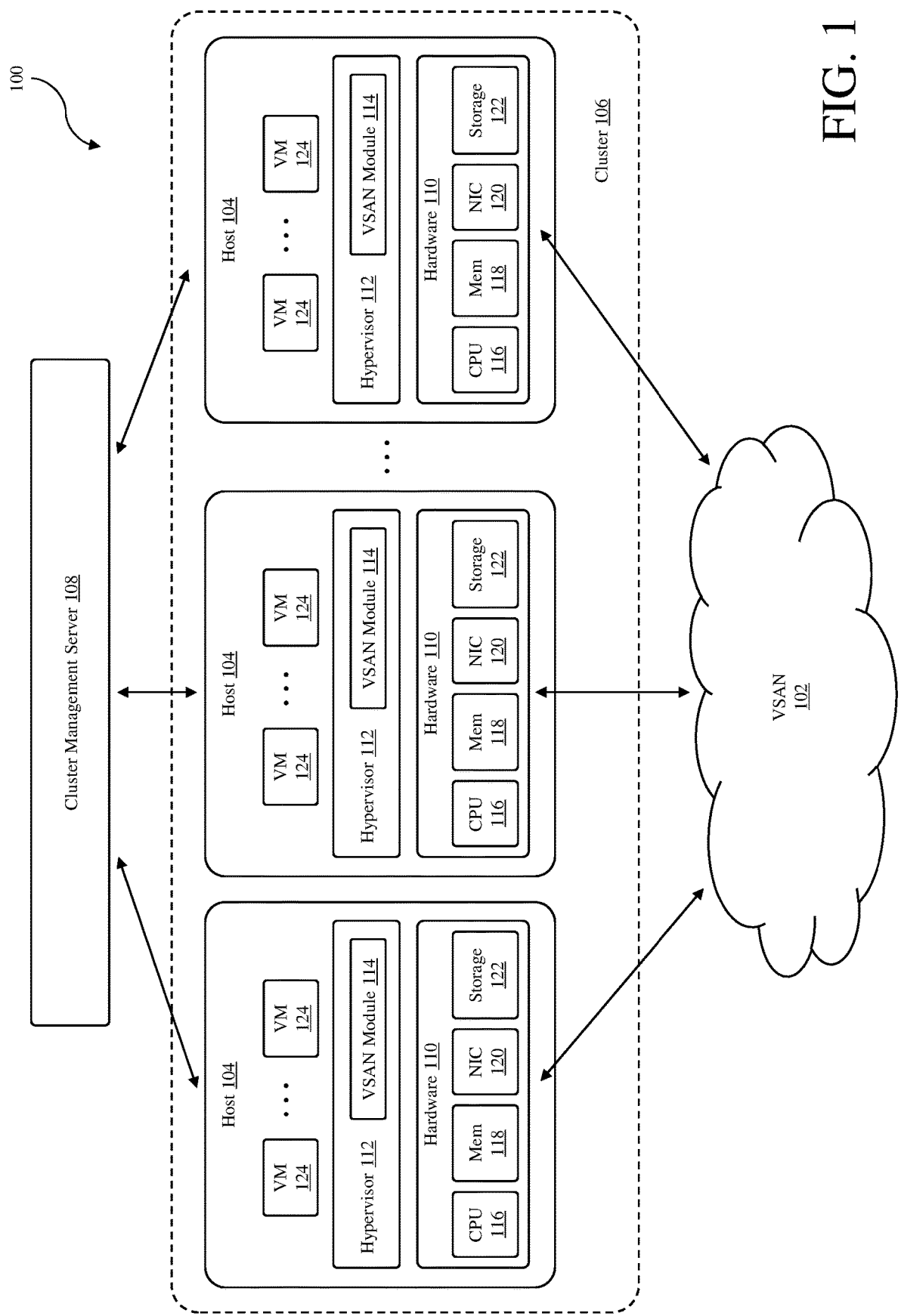
FIG. 1 is a block diagram of a distributed storage system in accordance with an embodiment of the invention.

FIG. 1 illustrates a distributed storage system 100 in accordance with an embodiment of the invention. As shown in FIG. 1, the distributed storage system 100 provides a software-based "virtual storage area network" (VSAN) 102 that leverages local storage resources of host computers 104, which are part of a logically defined cluster 106 of host computers that is managed by a cluster management server 108. The VSAN 102 allows local storage resources of the host computers 104 to be aggregated to form a shared pool of storage resources, which allows the host computers 104, including any software entities running on the host computers, to use the shared storage resources. Due to the sharing of the storage resources, numerous secure connections between the host computers are created and closed. As described below, the distributed storage system 100 implements a multiple use key scheme so that a set of symmetric encryption/decryption keys (simply referred to herein as "symmetric keys") is not created for each connection from one host computer 104 in the cluster 106 to another host computer 104 in the cluster 106, which reduces the number of symmetric keys being managed by the system. Thus, the resource overhead to manage the symmetric keys in the distributed storage system 100 is significantly reduced. In addition, the key scheme implemented in the distributed storage system 100 protects transmitted data or messages from man-in-the-middle (MI™) attacks and replay attacks.

The cluster management server 108 of the distributed storage system 100 operates to manage and monitor the cluster 106 of host computers 104. The cluster management server 108 may be configured to allow an administrator to create the cluster 106, add host computers to the cluster and delete host computers from the cluster. The cluster management server 108 may also be configured to allow an administrator to change settings or parameters of the host computers in the cluster regarding the VSAN 102, which is formed using the local storage resources of the host computers in the cluster. The cluster management server 108 may further be configured to monitor the current configurations of the host computers and any virtual instances running on the host computers, for example, virtual machines (VMs). The monitored configurations may include hardware configuration of each of the host computers and software configurations of each of the host computers. The monitored configurations may also include virtual instance hosting information, i.e., which virtual instances (e.g., VMs) are hosted or running on which host computers. The monitored configurations may also include information regarding the virtual instances running on the different host computers in the cluster.

The cluster management server 108 may also perform operations to manage the virtual instances and the host computers 104 in the cluster 106. As an example, the cluster management server 108 may be configured to perform various resource management operations for the cluster, including virtual instance placement operations for either initial placement of virtual instances and/or load balancing. The process for initial placement of virtual instances, such as VMs, may involve selecting suitable host computers for placement of the virtual instances based on, for example, memory and central processing unit (CPU) requirements of the virtual instances, the current memory and CPU loads on all the host computers in the cluster, and the memory and CPU capacity of all the host computers in the cluster.

In some embodiments, the cluster management server 108 may be a physical computer. In other embodiments, the cluster management server may be implemented as one or more software programs running on one or more physical computers, such as the host computers 104 in the cluster 106, or running on one or more virtual machines, which may be hosted on any host computers. In an implementation, the cluster management server is a VMware vCenter™ server with at least some of the features available for such a server.

As illustrated in FIG. 1, each host computer 104 in the cluster 106 includes hardware 110, a hypervisor 112, and a VSAN module 114. The hardware 110 of each host computer includes hardware components commonly found in a physical computer system, such as one or more processors 116, one or more system memories 118, one or more network interfaces 120 and one or more local storage devices 122 (collectively referred to herein as "local storage"). Each processor 116 can be any type of a processor, such as a CPU commonly found in a server. In some embodiments, each processor may be a multi-core processor, and thus, includes multiple independent processing units or cores. Each system memory 118, which may be random access memory (RAM), is the volatile memory of the host computer 104. The network interface 120 is an interface that allows the host computer to communicate with a network, such as the Internet. As an example, the network interface may be a network adapter. Each local storage device 122 is a nonvolatile storage, which may be, for example, a solid-state drive (SSD) or a magnetic disk.

The hypervisor 112 of each host computer 104, which is a software interface layer, enables sharing of the hardware resources of the host computer by virtual instances 124, such as VMs, running on the host computer using virtualization technology. With the support of the hypervisor 112, the VMs provide isolated execution spaces for guest software.

The VSAN module 114 of each host computer 104 provides access to the local storage resources of that host computer (e.g., handle storage input/output (I/O) operations to data objects stored in the local storage resources as part of the VSAN 102) by other host computers 104 in the cluster 106 or any software entities, such as VMs 124, running on the host computers in the cluster. As an example, the VSAN module of each host computer allows any VM running on any of the host computers in the cluster to access data stored in the local storage resources of that host computer, which may include virtual disks (or portions thereof) of VMs running on any of the host computers and other related files of those VMs.

Thus, the VSAN module 114 of each host computer 104 in the cluster 106 may need to open and close multiple data communication connections with VSAN modules of other host computers in the cluster. If a typical cryptographic protocol, such as Transport Layer Security (TLS) protocol, is used for these connections in a standard manner, each new connection would require a unique set of symmetric keys for encryption and decryption. As a result, there can be a challenging number of symmetric keys that must be created and managed by the VSAN modules of the host computers in the cluster. As described below, the distributed storage system 100 implements a key reusing scheme to reduce the number of symmetric keys that are used in the system to reduce the overhead for creating and maintaining the symmetric keys for the encrypted connections.

Figure 2:
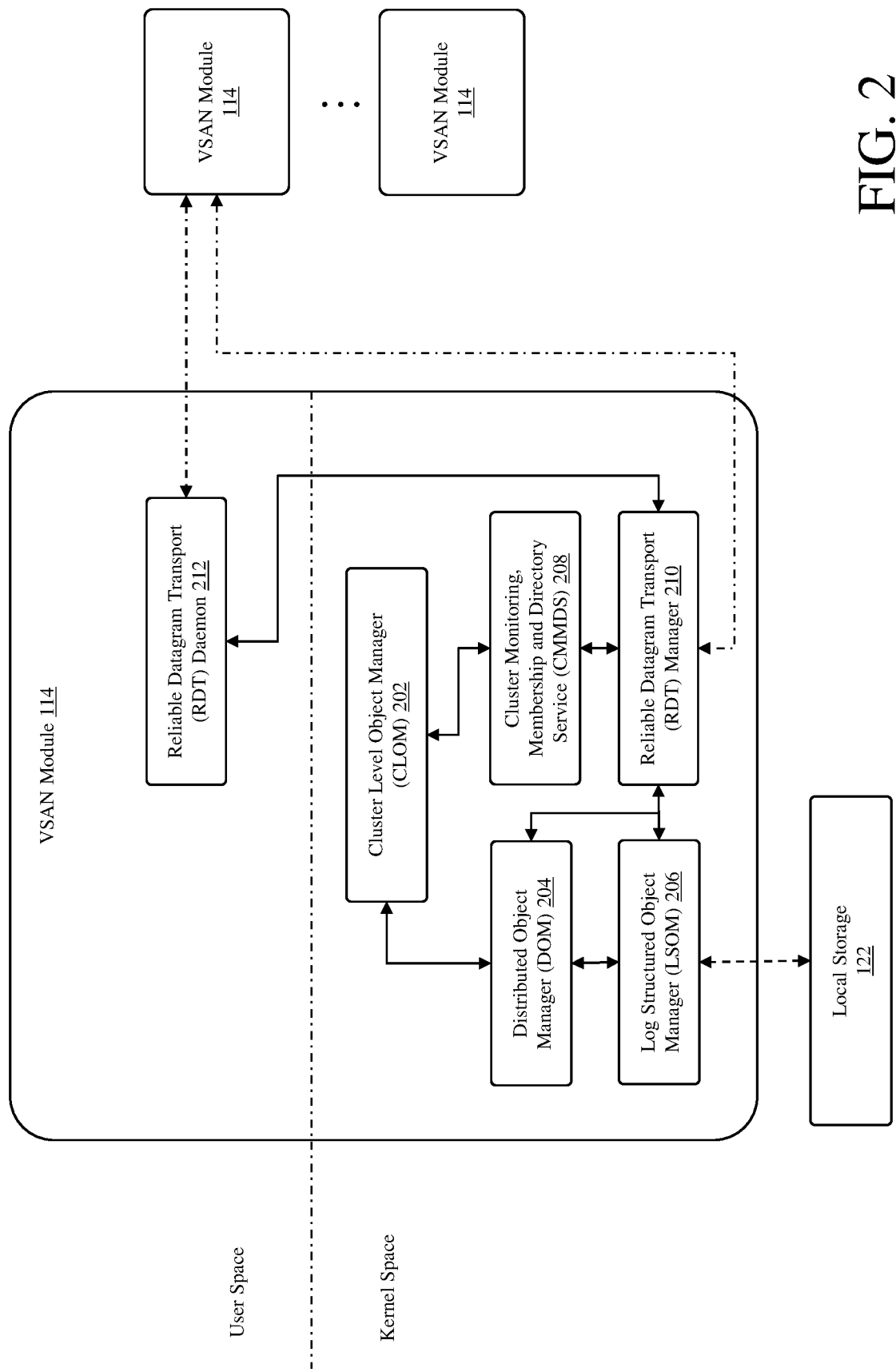
FIG. 2 is a block diagram of a virtual storage array network (VSAN) module in each host computer of the distributed storage system in accordance with an embodiment of the invention.

Turning now to FIG. 2, components of the VSAN module 114, which is included in each host computer 104 in the cluster 106, in accordance with an embodiment of the invention are shown. As illustrated in FIG. 2, the VSAN module includes a cluster level object manager (CLOM) 202, a distributed object manager (DOM) 204, a local log structured object management (LSOM) 206, a cluster monitoring, membership and directory service (CMMDS) 208, a reliable datagram transport (RDT) manager 210, and a reliable datagram transport (RDT) daemon 212. These components of the VSAN module may be implemented as software running on each of the host computers in the cluster.

The CLOM 202 operates to validate storage resource availability, and the DOM 204 operates to create components and apply configuration locally through the LSOM 206. The DOM 204 also operates to coordinate with counterparts for component creation on other host computers 104 in the cluster 106. All subsequent reads and writes to storage objects funnel through the DOM 204, which will take them to the appropriate components. The LSOM 206 operates to monitor the flow of storage I/O operations to the local storage 122, for example, to report whether a storage resource is congested. The CMMDS 208 is responsible for monitoring the VSAN cluster's membership, checking heartbeats between the host computers in the cluster, and publishing updates to the cluster directory. Other software components use the cluster directory to learn of changes in cluster topology and object configuration. For example, the DOM uses the contents of the cluster directory to determine the host computers in the cluster storing the components of a storage object and the paths by which those host computers are reachable.

The RDT manager 210 is the communication mechanism for storage-related data or messages in a VSAN network, and thus, can communicate with the VSAN modules 114 in other host computers 104 in the cluster 106. As used herein, storage-related data or messages (simply referred to herein as "messages") may be any pieces of information, which may be in the form of data streams, that are transmitted between the host computers 104 in the cluster 106 to support the operation of the VSAN 102. Thus, storage-related messages may include data being written into the VSAN 102 or data being read from the VSAN 102. In an embodiment, the RDT manager uses the Transmission Control Protocol (TCP) at the transport layer and it is responsible for creating and destroying on demand TCP connections (sockets) to the RDT managers of the VSAN modules in other host computers in the cluster. In other embodiments, the RDT manager may use remote direct memory access (RDMA) connections to communicate with the other RDT managers. For encrypted connections, the RDT manager uses one or more symmetric keys, which are created by the RDT daemon 212, to encrypt outgoing storage-related messages and/or to and decrypt incoming storage-related messages from the RDT managers in other host computers in the cluster. As explained below, each symmetric key is repeatedly used for message transmission connections between the RDT managers of a particular pair of host computers in the cluster until a new replacement symmetric key is generated, which is then repeatedly used for message transmission connections between the two RDT managers until another new replacement symmetric key is generated.

In the illustrated embodiment, the RDT manager 210, as well as the CLOM 202, the DOM 204, the LSOM 206 and the CMMDS 208, runs in the kernel space, which is the protected memory space that is strictly reserved for running a privileged operating system kernel, kernel extensions, and most device drivers. Consequently, cryptographic protocols, such as the Transport Layer Security (TLS) protocol, cannot be leveraged directly for secure communications. However, the RDT daemon 212 runs in the user space, which is the memory space where user-controlled applications run. Thus, as explained below, the RDT daemon 212 can be used to leverage a standard cryptographic protocol, such as the TLS protocol, to acquire symmetric keys, which can then be used by the RDT manager 210 for encrypted connections to the RDT managers of the VSAN modules 114 in the other host computers 104 in the cluster 106.

In an embodiment, when the RDT manager 210 wants to securely communicate with another host computer in the cluster 106, in particular, with the RDT manager of that host computer, the RDT manager 210 sends a request to the RDT daemon 212 to initiate a cryptographic protocol connection, such as a TLS connection, with the RDT daemon of the other host computer. In response, the two RDT daemons execute a handshake process to establish the cryptographic protocol connection, which results in a symmetric key at each of the two RDT daemons. Each of the two RDT daemons then passes its symmetric key to the RDT manager that reside at the respective host computer. That is, the symmetric key held by the RDT daemon in a particular host computer is passed to the RDT manager of that particular host computer. The RDT managers of these two host computers can then use their symmetric keys for their communications with the other RDT manager so that storage-related messages are securely transmitted between the two host computers. This process is further described using an example depicted in FIG. 3, which shows secure message transmission from a VSAN module 114A of a host 104A having local storage 122A to a VSAN module 114B of a host 104B having local storage 122B. The VSAN modules 114A and 114B include all the components of the VSAN module 114 depicted in FIG. 2.

If the VSAN module 114A of the host 104A wants to securely transmit storage-related messages to the VSAN module 114B of a host 104B, each of the VSAN modules needs to have in its possession a symmetric key for encryption and decryption. Specifically, the VSAN module 114A needs the symmetric key to encrypt the storage-related messages to be transmitted to the VSAN module 114B. The VSAN module 114B needs the same or corresponding symmetric key to decrypt the received storage-related messages from the VSAN module 114A. These symmetric keys are created by RDT daemons 212A and 212B in the VSAN modules 114A and 114B, respectively, in response to a key request from the RDT manager 210A.

This pair of symmetric keys are created by the RDT daemons 212A and 212B as part of a handshake operation of a cryptographic protocol connection, such as a TLS connection, between the RDT daemons 212A and 212B. However, the cryptographic protocol connection between the RDT daemons 212A and 212B is not used to transmit storage-related messages. Rather, the symmetric keys created by the RDT daemons 212A and 212B are passed down to the RDT managers 210A and 210. Specifically, the symmetric key derived by the RDT daemon 212A is passed down to the RDT manager 210A. The symmetric key derived by the RDT daemon 212B is passed down to the RDT manager 210B. Once both RDT managers 210A and 210B have their respective symmetric keys, the symmetric keys are used by the RDT managers 210A and 210B to securely transmit storage-related messages from the RDT manager 210A to the RDT manager 210B via a data transport connection, such as a TCP connection, between the RDT managers 210A and 210B. Specifically, the symmetric key held by the RDT manager 210A is used to encrypt the storage-related messages for transmission to the RDT manager 210B. The symmetric key held by the RDT manager 210B is used to decrypt the encrypted storage-related messages from the RDT manager 210A. Thus, a first-type communication connection, e.g., a TLS connection, is used by the RDT daemons 212A and 212B to derive a pair of symmetric keys, which may be identical or substantially similar (i.e., a simple transformation may be needed to make them identical). Then, a second-type communication connection, e.g., a TCP or RDMA connection, is used by the RDT managers 210A and 210B to transmit encrypted storage-related messages using the symmetric keys. In an embodiment, if storage-related messages are to be transmitted from the host 104B to the host 104A, a different pair of symmetric keys will be needed for such communications.

In this fashion, storage-related messages can be securely transmitted from the host 104A to the host 104B. In addition, the symmetric keys held by the RDT managers 210A and 210B are reused to securely transmit additional storage-related messages from the RDT manager 210A to the RDT manager 210B via subsequent message transmission connections between the RDT managers 210A and 210B. Thus, a new set of symmetric keys is not generated for each message transmission connection between the RDT managers 210A and 210B. Rather, a new pair of symmetric keys is generated after a predefined period of time, e.g., 1 day, since the current pair of symmetric keys were created, or after a predefined number or amount of storage-related messages have been transmitted using current pair of symmetric keys.

Since a pair of symmetric keys are used for multiple message transmission connections between the RDT managers 210A and 210B to encrypted storage-related messages from the host 104A to the host 104B, the number of encrypted keys that have to be created and managed by the RDT managers 210A and 210B is significantly reduced. Thus, less resources are needed to create and manage the symmetric keys for the hosts 104A and 104B. When these resource savings are considered for all the hosts 104 in the cluster 106, the total resource savings for the distributed storage system 100 are significant.

Figure 3:
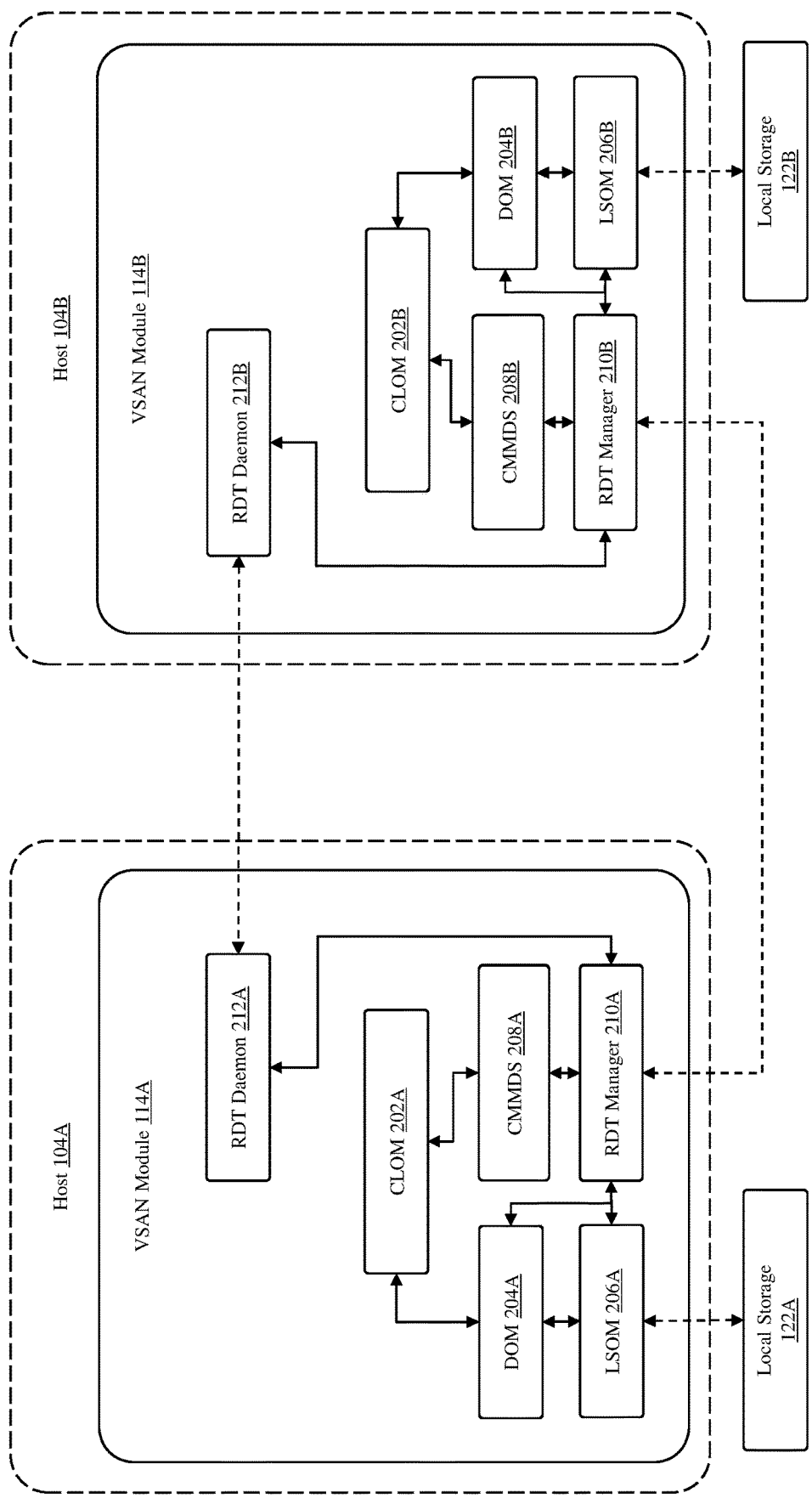
FIG. 3 illustrates a message transmission process from the VSAN module of a source host computer to the VSAN module of a target host computer in the distributed storage system in accordance with an embodiment of the invention.

A message transmission process from a source host computer (referred to herein as "source node") in the distributed storage system 100 to a target host computer (referred to herein as "target node") in the distributed storage system 100 using the key reusing scheme in accordance with an embodiment of the invention is described with reference to a flow diagram of FIG. 4 using the hosts 104A and 104B shown in FIG. 3 as an example. In this example, messages are being transmitted from the host 104A, which is the source host or node, to the host 104B, which is the target host node. In addition, a TLS connection is used to acquire a pair of symmetric keys and a TCP connection is used to transmit the messages from the source host 104A to the target host 104A. However, in other embodiments, a different cryptographic connection may be used instead of a TLS connection to acquire the symmetric keys and a different message transmission connection may be used instead of a TCP connection to transmit the messages.

Figure 4:
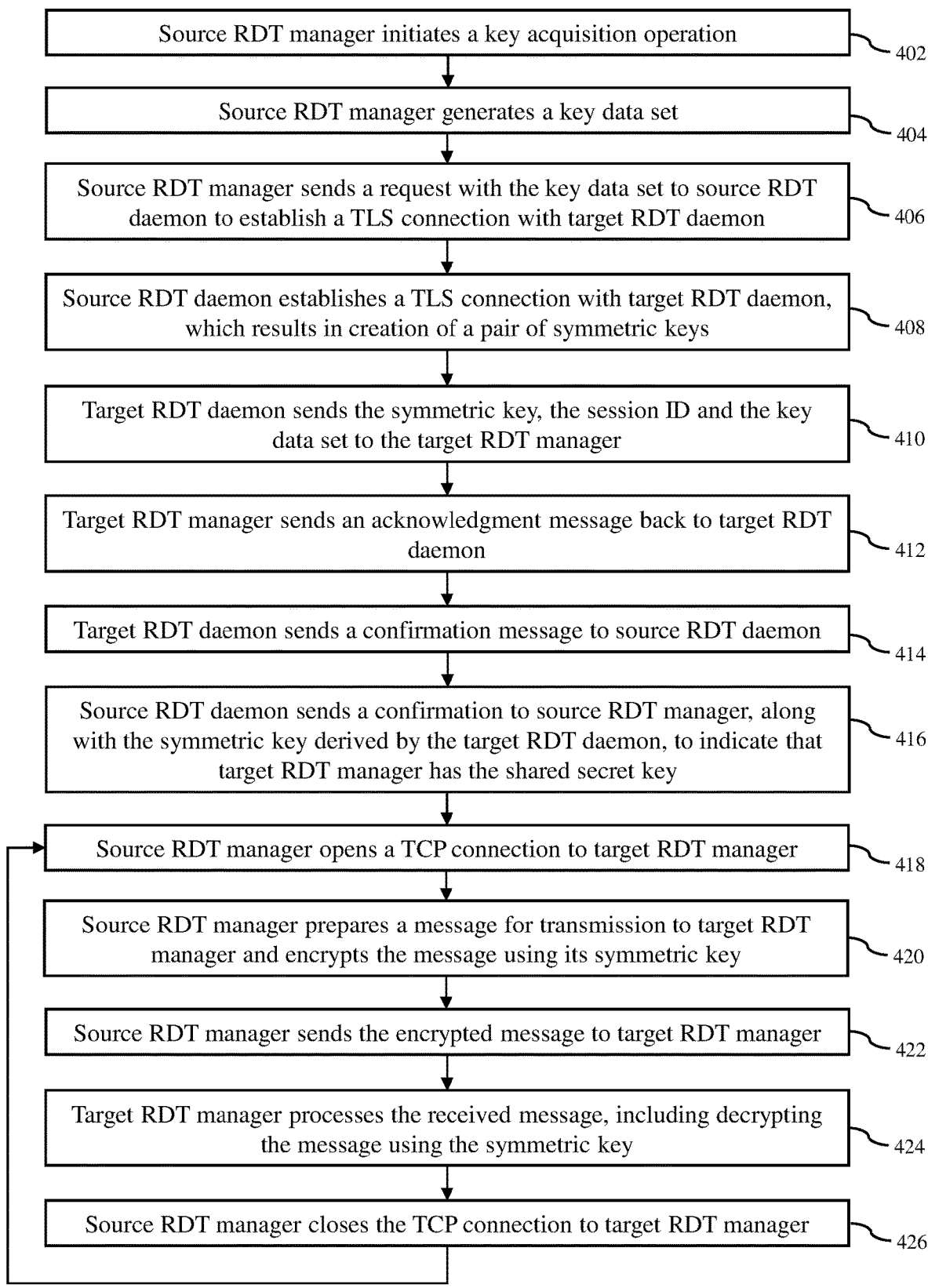
FIG. 4 is a flow diagram of a message transmission process from a source host computer in the distributed storage system to a target host computer in the distributed storage system 100 using a key reusing scheme in accordance with an embodiment of the invention.

As shown in FIG. 4, the process begins at step 402, where the RDT manager 210A of the source host 104A (referred to herein as the "source RDT manager") initiates a key acquisition operation to derive a symmetric key to be used for encryption and decryption of messages transmitted from the source host 104A to the target host 104B. Specifically, the symmetric key is used to encrypt the messages by the source RDT manager 210A of the source host 104A for transmission to the target host 104B and is also used to decrypt the messages by the RDT manager 210B of the target host 104B (referred to herein as "target RDT manager") when the messages are received at the target host 104B.

Next, at step 404, the source RDT manager 210A generates a key data set, which includes information that is needed to generate the symmetric keys. This key data set may be identified using a name, for example, key-id. The key data set may include an identification of the source node ("FromNode"), an identification of the target node ("TargetNode"), a key generation value ("KeyGenerationID") and an identification of the symmetric key ("keyID"), which may be expressed as key-id=<FromNode, TargetNode, KeyGenerationID, keyID>. In an embodiment, universally unique identifiers (UUIDs) may be used for the identifications of the source node, the target node and the symmetric key.

Next, at step 406, the source RDT manager 210A sends a request with the key data set to the RDT daemon 212A of the source host 104A (referred to herein as the "source RDT daemon") to establish a TLS connection with the RDT daemon 212B of the host 104B (referred to herein as the "target RDT daemon").

Next, at step 408, in response to the request, the source RDT daemon 212A establishes a cryptographic connection, e.g., a TLS connection, with the target RDT daemon 212B. The handshake process of establishing a TLS connection between the source RDT daemon 212A and the target RDT daemon 212B results in creation of a symmetric key at the source RDT daemon and at the target RDT daemon. Thus, a pair of identical symmetric keys are created and associated with the TLS connection session, which is assigned a particular session ID. Thus, each of the source and target RDT daemons will have the same symmetric key in its possession, e.g., in an accessible part of the volatile memory of their respective host computer, i.e., the host 104A or 104B.

An example of a TLS handshake process for a particular selected cipher suite, TLS_ECDHE_RSA_WITH_AES_256_GCM_SHA384, is now described. In this description, the source RDT daemon 212A is the client and the target RDT daemon 212B is the server. First, the client sends a hello message to the server to initiate a TLS connection. The hello message includes a list of supported cipher suites and a random number generated by the client (referred to herein as "ClientRandom"). It is assumed here that the selected cipher suite is included in the list of supported cipher suites. Upon receiving the request, the server agrees to accept the connection and sends back the selected cipher suite and also server-side generated random number (referred to herein as "ServerRandom").

Next, the server then sends its certificate, which may include the signing certificate authority (CA) certificates in a chain, to the client. By this certificate, the server declares its identity to the client. The server may also send a server key exchange message, which is an optional message, but mandatory for the Elliptic Curve Diffie Hellman Ephemeral (ECDH-ephemeral, i.e., ECDHE) cipher suite. To generate this message, the server will choose an elliptical curve and generate a pair of keys for ECDH use, i.e., a public key and a private key. It is noted here that "ephemeral" means the key pair will always be generated every time, instead of using a fixed pair of keys. The message will include (1) server key exchange parameters, including the elliptical curve parameters and the public key and (2) a signature for hash of [ClientRandom+ServerRandom+server key exchange parameters]. The hash is signed using server's private RSA key (corresponding to the certificate it uses), so that the client can verify that the server has the private key, which means that it is the identity it declared with the certificate. The server then sends another message to the client to confirm that the server has completed all the messages for this portion of the process.

In response, the client will determine whether to trust the identity and verify the server's identity by verifying the signature. If it passes, the client will use the same elliptical curve to generate its own pair of keys and send the public key in a client key exchange message to the server. After this step, each of the server and the client will have both public keys for the server and the client, plus its own private key, which is enough for each of the server and the client to figure out a common shared key based on ECDH algorithm. DH algorithm ensures forward secrecy since man-in-the-middle (MI™) cannot figure out the common secret even if it records all exchanged messages. The result of DH algorithm is a pre-master secret and both peers will follow the cipher suite specified pseudo-random function (PRF) to derive the required set of keys for encryption/signature usages, i.e., the symmetric keys.

Next, the client sends an empty confirmation message to the server to notify the server that it is about to start an encrypted communication in the session using the keys in its possession. The client then computes the PRF of the master key and all previous handshake messages as verify data and sends the verify data in a finish message to the server so that the server can verify that the TLS handshake generated the same shared secret for both peers. Correspondingly, the server will also send an empty confirmation message to notify the client and a finish message with a verify data computed in the same manner to let the client verify that the TLS handshake generated the same shared secret for both peers. Both the client and the server can now derive the symmetric keys, which can be used for encryption/decryption.

Turning back to FIG. 4, next, at step 410, the target RDT daemon 212B sends the symmetric key, the session ID and key data set to the target RDT manager 210B. The symmetric key is the key derived by the target RDT daemon 212B as a result of the TLS handshake operation. Thus, the target RDT manager 210B will have the symmetric key in its possession, which may be stored in an accessible part of the volatile memory of the host 104B.

Next, at step 412, the target RDT manager 210B sends an acknowledgement message back to the target RDT daemon 212B to confirm that the target RDT manager has properly received the symmetric key, the session ID and key data set. Since the target RDT manager 210B has the symmetric key, the target RDT manager is ready to receive and decrypt messages transmitted from the source RDT manager 210A that have been encrypted using the same symmetric key.

Next, at step 414, the target RDT daemon 212B sends a confirmation message to the source RDT daemon 212A to indicate that the symmetric key has been successfully passed to the target RDT manager 210B to properly decrypt messages transmitted from the source RDT manager 210A that have been encrypted using the same symmetric key.

Next, at step 416, the source RDT daemon 212A sends a confirmation to the source RDT manager 210A, along with the symmetric key derived by the target RDT daemon as a result of the TLS handshake operation. The confirmation from the source RDT daemon 212A to the source RDT manager 210A indicates that the target RDT manager 210B has the symmetric key from the target RDT daemon 212B and is ready to receive encrypted messages from the source RDT manager. In addition, the source RDT manager now has the symmetric key for encryption in its possession, which may be stored in an accessible part of the volatile memory of the host 104A.

Next, at step 418, the source RDT manager 210A opens a TCP connection to the target RDT manager 210B to securely transmit a message from the source host 104A to the target host 104B.

Next, at step 420, the source RDT manager 210A prepares the message for transmission to the target RDT manager 210B and encrypts the message using the symmetric key in its possession. As an example, the source RDT manager 210A may add a new header with various information to the message. This message processing operation performed by the source RDT manager 210A will be described in detail below with references to FIG. 5.

Next, at step 422, the source RDT manager 210A sends the encrypted message to the target RDT manager 210B through the established TCP connection. In an embodiment, the encrypted message is sent as a data stream.

Next, at step 424, the target RDT manager 210B processes the received message from the source RDT manager 210A, including decrypting the received message using the symmetric key in its possession. Thus, the target RDT manager 210B uses the symmetric key that was received from the target RDT daemon 212B on the received message for decryption.

Next, at step 426, the source RDT manager 210A closes the TCP connection to the target RDT manager 210B. As an example, closing of the TCP connection may involve transmitting a termination request packet and receiving an acknowledgment between the source and target RDT managers.

The process can then return to step 418 when the source RDT manager 210A wants to transmit an additional message to the target RDT manager 210B using another TCP connection, but using the same symmetric keys held by the source and target RDT managers. Thus, the same pair of symmetric keys can be reused for multiple TCP connections to transmit messages from the source host 104A to the target host 104B.

A message processing operation at a source RDT manager in the distributed storage system 100 for transmission to a target RDT manager in the distributed storage system 100 in accordance with an embodiment of the invention is described with reference to a flow diagram of FIG. 5 using the hosts 104A and 104B shown in FIG. 3 as an example. This message processing operation is executed at step 420 of the flow diagram shown in FIG. 5 for a message transmission process.

Figure 5:
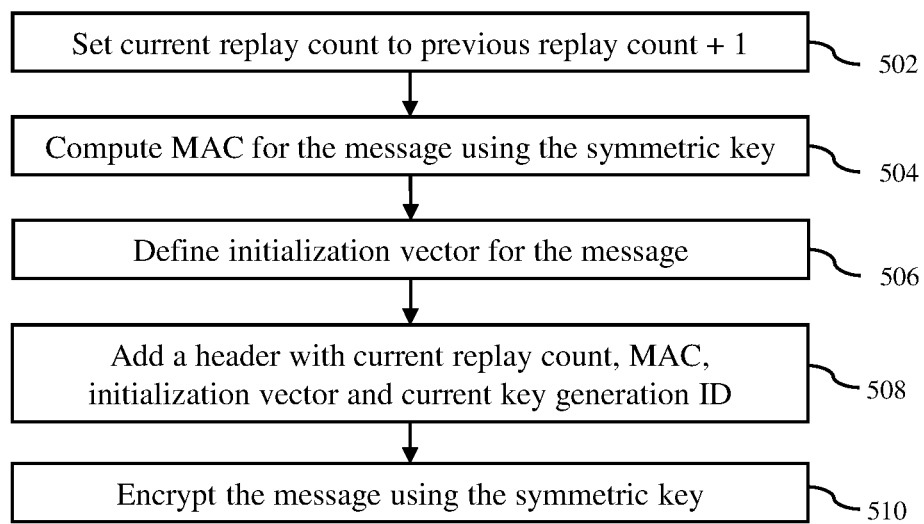
FIG. 5 is a flow diagram of a message processing operation at a source RDT manager for transmission to a target RDT manager in accordance with an embodiment of the invention.

As shown in FIG. 5, the operation begins at step 502, where the source RDT manager 210A sets the current replay count for a message, which is to be transmitted to the target RDT manager 210B, to the previous replay count plus one, where the previous replay count is initially set to a default value, such as zero. Thus, the current replay count for the message is incrementally increased from the previous replay count that was used for the previous message that was transmitted to the target RDT manager 210B or from the default value if the message is the first message from the source RDT manager 210A to the target RDT manager 210B. In this embodiment, the replay counts of messages from the source RDT manager 210A to the target RDT manager 210B are incrementally and sequentially increased by a value of one. However, in other embodiments, the replay counts of messages to the target RDT manager 210B may be sequentially changed by any positive or negative value from the previous count value.

Next, at step 504, a message authentication code (MAC) for the message is computed by the source RDT manager 210A using the symmetric key. The MAC is used to authenticate the message being transmitted from the source RDT manager 210A to the target RDT manager 210B. In an embodiment, the MAC may be calculated by including the current replay count with the message (which includes an original header and a payload) so that no one can tamper with the replay count for the message. The MAC may be calculated using any known MAC algorithm.

Next, at step 506, the initialization vector for the message is defined by the source RDT manager 210A. As an example, the initialization vector may be a 64-bit vector. In an embodiment, a different initialization vector is used for each message from the source RDT manager 210A to the target RDT manager 210B.

Next, at step 508, a header with the current replay count, the MAC, the initialization vector and the current key generation ID is added to the message by the source RDT manager 210A.

Next, at step 510, the message is encrypted using the symmetric key by the source RDT manager 210A. In an embodiment, the added header with the current replay count, the MAC, the initialization vector and the current key generation ID is not encrypted. In this embodiment, only the original message, which may include an original header, is encrypted. The encrypted message is now ready to be transmitted to the target RDT manager 210B through a TCP connection between the source RDT manager 210B and the target RDT manager 210B.

A message processing operation at a target RDT manager in the distributed storage system 100 for a received message from a source RDT manager in the distributed storage system 100 in accordance with an embodiment of the invention is described with reference to a flow diagram of FIG. 6 using the hosts 104A and 104B shown in FIG. 3 as an example. This message processing operation is executed at step 424 of the flow diagram shown in FIG. 4 for a message transmission process.

Figure 6:
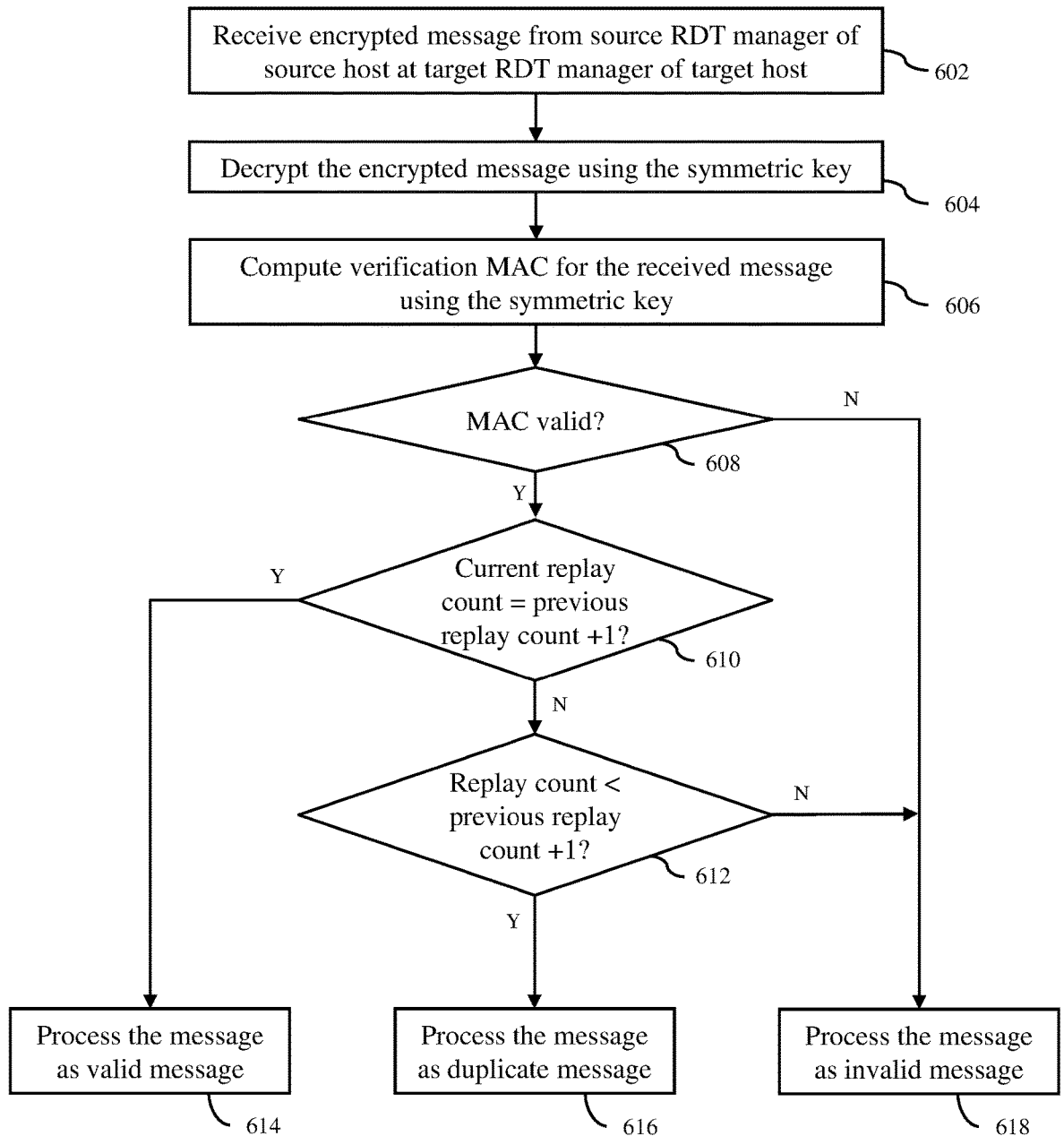
FIG. 6 is a flow diagram of a message processing operation at a target RDT manager for a received message from a source RDT manager in accordance with an embodiment of the invention.

As shown in FIG. 6, the operation begins at step 602, where the encrypted message from the source RDT manager 210A of the source host 104A is received at the target RDT manager 210B of the target host 104B through a TCP connection.

Next, at step 604, the encrypted message is decrypted by the target RDT manager 210B using the symmetric key, which was sent from the target RDT daemon 212B to the target RDT manager 210B.

Next, at step 606, a verification MAC is computed by the target RDT manager 210B using the symmetric key. The verification MAC is computed in the same manner as the MAC included in the received message. Thus, the verification MAC may be calculated by including the current replay count in the message header and the message (which includes the original header and the payload). The verification MAC is calculated using the same MAC algorithm that was used for the MAC included in the received message.

Next, at step 608, a determination is made by the target RDT manager 210B whether the MAC in the received message is valid or not. The MAC in the received message is valid if the MAC matches the verification MAC, i.e., the MAC in the received matches is identical to the verification MAC, which indicates that the message has not been altered. If the MAC is not valid, the operation proceeds to step 618, where the message is processed as an invalid message. However, if the MAC is valid, the operation proceeds to step 610.

At step 610, a determination is made by the target RDT manager 210B whether the replay count in the header of the message (referred to herein as "current replay count") is equal to the replay count of the previous message (referred to herein as "previous replay count") from the source RDT manager 210A plus a predefined increment, for example, an increment of one in this embodiment. That is, a determination is made whether the current replay count=previous replay count+1. If the current replay count equals the previous replay count plus one, the operation proceeds to step 614, where the message is processed as a valid message. However, if the current replay count does not equal the previous replay count plus one, the operation proceeds to step 612.

At step 612, a determination is made by the target RDT manager 210B whether the current replay count is less than the previous replay count plus one. That is, a determination is made whether the current replay count<previous replay count+1. If the current replay count is less than the previous replay count plus 1, the operation proceeds to step 616, where the message is processed as a duplicate message. However, if the current replay count is not less than the previous replay count plus one, the operation proceeds to step 618, where the message is processed as an invalid message. In an embodiment, if the message is determined to be a duplicate message, then the target RDT manager 210B drops or deletes the message and/or notify the application that initiated a storage operation that the same message has been received again. In an embodiment, if the message is determined to be an invalid message, which indicates a replay attack, then the target RDT manager 210B closes the TCP connection to prevent more attacks.

In an embodiment, a rekey operation is periodically performed to replace the current symmetric keys being used by the source and target RDT managers 210A and 210B to transmit secure messages through multiple TCP connections with a new pair of symmetric keys. For example, a rekey operation may be initiated by the source RDT manager 210 after a predefined period of time or after a predefined of messages have been securely transmitted from the source RDT manager 210A to the target RDT manager 210B since the current symmetric keys were derived. A rekey operation is similar to the initial derivation of the symmetric keys, as described above with respect to FIG. 4. Thus, a rekey operation executes steps 404-416 of the flow diagram depicted in FIG. 4, where a new key generation ID and new key ID are generated by the source RDT manager 210A to request a new key from the source RDT daemon 212A. In an embodiment, the new key generation ID is the previous key generation ID increased by one or another fixed value.

In order to smoothly transition from the current set of symmetric keys to the new replacement set of symmetric keys, the source and target RDT managers 210A and 210B will observe a short window of time after the new replacement set of symmetric keys have been obtained. During this window of time, messages can be encrypted/decrypted using either the current (old) set of symmetric keys or the new replacement set of symmetric keys. Thus, during this window of time, the source RDT manager 210A may use either the current symmetric key or the new replacement symmetric key to encrypt messages. Accordingly, when a message is received during this window of time, the target RDT manager 210B will try to decrypt the message using one of the current and new replacement symmetric key. If it is not successful, the target RDT manager 210B will decrypt the message using the other symmetric key. After this window of time, only the new replacement set of symmetric keys is allowed to be used for encryption and decryption by the source and target RDT managers 210A and 210B.

In an embodiment, the RDT managers 210 in the host computers 104 of the cluster 106 may operate in either the "encrypted" mode or the "decrypted" mode. In this embodiment, each RDT manager will enforce its connection to be encrypted or non-encrypted based on its mode. However, in order to make the transition between the encrypted mode and the non-encrypted mode less disruptive, each of the RDT managers 210 in the host computers 104 of the cluster 106 may be individually set to a transitioning state, which may be indicated by a "changing" flag. If the "changing" flag is set to true for an RDT manager, then that RDT manager will not enforce the traffic to be encrypted or non-encrypted. Thus, that RDT manager will be able to talk its peers of both encrypted and non-encrypted modes.

This transitioning feature may be used to turn on or turn off encryption for the entire cluster 106. As an example, if an administrator wants to turn on encryption for the cluster 106, the administrator will enter an appropriate command to the cluster management server 108. In response, the cluster management server 108 will update all the host computers 104 in the cluster 106 to "encrypted" mode with the "changing" state set to true. Thus, all connections between the host computers 104 will stay unencrypted in the transitioning stage. Next, the cluster management server 108 will orchestrate a workflow to turn off the "changing" flag for all the host computers 104 one by one with some interval of time between each flag change that allows each host computer to reset all unencrypted connections and reestablish encrypted connections. At the end, the "changing" flags for all the host computers 104 in the cluster 106 will have been set to false and all the host computers will enforce the encrypted mode. In a similar manner, the encryption for the entire cluster 106 may be turned off using the transitioning feature.

Figure 7:
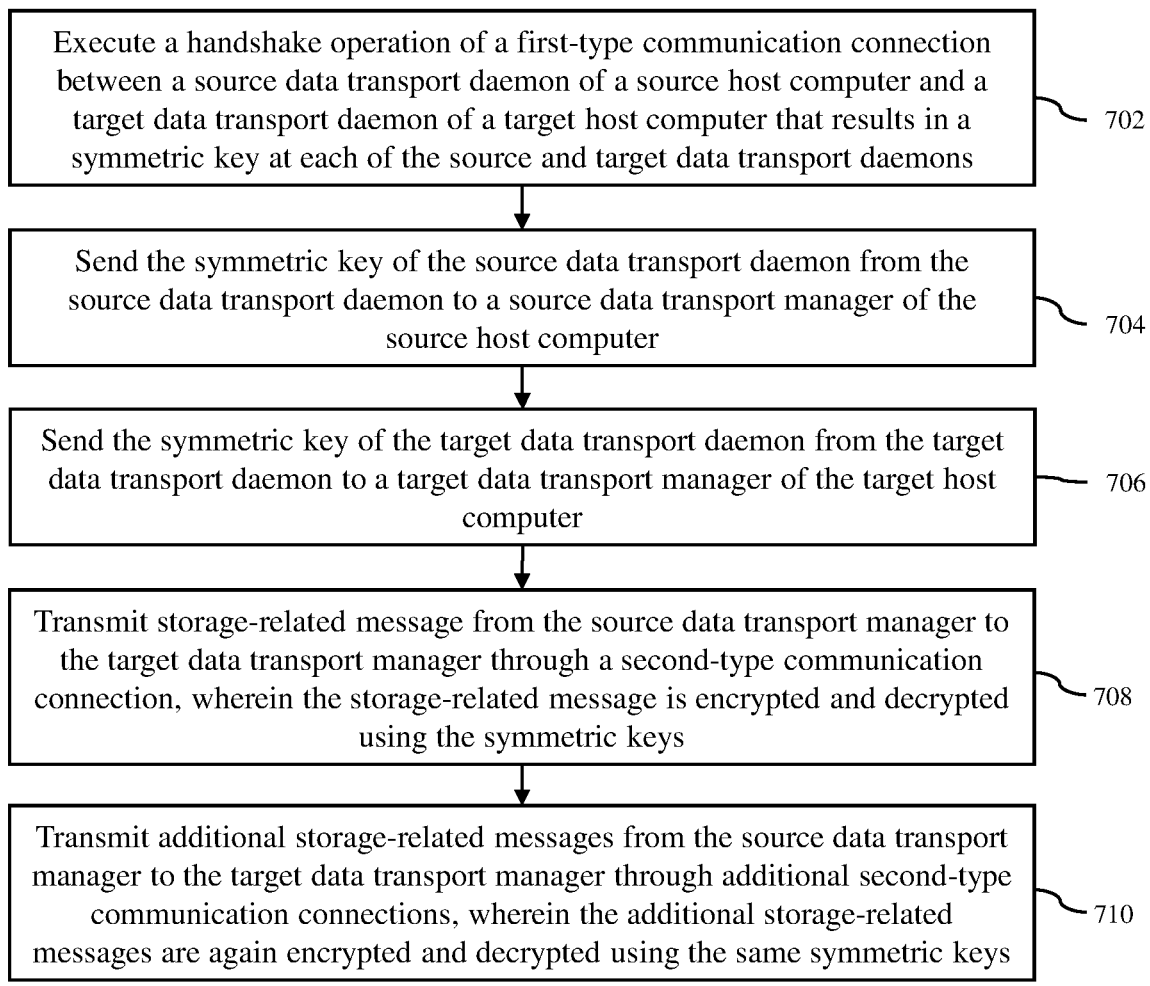
FIG. 7 is a flow diagram of a computer-implemented method for transmitting storage-related messages between host computers in a distributed storage system in accordance with an embodiment of the invention.

A computer-implemented method for transmitting storage-related messages between host computers in a distributed storage system in accordance with an embodiment of the invention is described with reference to a flow diagram of FIG. 7. At block 702, a handshake operation of a first-type communication connection between a source data transport daemon, e.g., an RDT daemon 212A shown in FIG. 3, of a source host computer in the distributed storage system and a target data transport daemon, e.g., an RDT daemon 212B shown in FIG. 3, of a target host computer in the distributed storage system is executed that results in a symmetric key at each of the source and target data transport daemons. At block 704, the symmetric key of the source data transport daemon is sent from the source data transport daemon to a source data transport manager, e.g., an RDT manager 210A shown in FIG. 3, of the source host computer. At block 706, the symmetric key of the target data transport daemon from the target data transport daemon is sent to a target data transport manager, e.g., an RDT manager 210B shown in FIG. 3, of the target host computer. At block 708, storage-related message is transmitted from the source data transport manager to the target data transport manager through a second-type communication connection between the source and target data transport managers, wherein the storage-related message is encrypted and decrypted using the symmetric keys at the source and target data transport managers. At block 710, transmitting additional storage-related messages are transmitted from the source data transport manager to the target data transport manager through additional second-type communication connections, wherein the additional storage-related messages are again encrypted and decrypted using the same symmetric keys at the source and target data transport managers.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, non-volatile memory, NVMe device, persistent memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for transmitting storage-related messages between host computers in a distributed storage system, the method comprising:

executing a handshake operation of a first-type communication connection between a source data transport daemon of a source host computer in the distributed storage system and a target data transport daemon of a target host computer in the distributed storage system that results in a symmetric key at each of the source and target data transport daemons;

sending the symmetric key of the source data transport daemon from the source data transport daemon to a source data transport manager of the source host computer;

sending the symmetric key of the target data transport daemon from the target data transport daemon to a target data transport manager of the target host computer;

transmitting storage-related message from the source data transport manager to the target data transport manager through a second-type communication connection between the source and target data transport managers, wherein the storage-related message is encrypted and decrypted using the symmetric keys at the source and target data transport managers; and transmitting additional storage-related messages from the source data transport manager to the target data transport manager through additional second-type communication connections, wherein the additional storage-related messages are again encrypted and decrypted using the same symmetric keys at the source and target data transport managers.

2. The method of claim 1, wherein the first-type communication connection between the source and target data transport daemons is a Transport Layer Security (TLS) connection.

3. The method of claim 2, wherein the second-type communication connection between the source and target data transport managers is a Transmission Control Protocol (TCP) connection or a remote direct memory access (RDMA) connection.

4. The method of claim 1, wherein the source and target data transport daemons are running in a user space of their respective host computers and the source and target data transport managers are running in a kernel space of their respective host computers.

5. The method of claim 1, further comprising:

adding a replay count in a header of the message at the source data transport manager, wherein the replay count is equal to a replay count of a previous message sent from the source data transport manager to the target data transport manager plus a predefined value.

6. The method of claim 5, further comprising:

computing a media authentication code (MAC) at the source data transport manager based on at least the replay count of the message using the symmetric key of the source data transport manager and adding the MAC in the header of the message; and verifying the MAC in the message at the target data transport manager by comparing the MAC with a verification MAC that is computed based on at least the replay count of the message using the symmetric key of the target data transport manager.

7. The method of claim 5, further comprising:

when the message is received at the target data transport manager, using the replay count of the message and a previous replay count of a previous message received from the source data transport manager to determine whether to process the received message as a valid message, an invalid message or a duplicate message.

8. The method of claim 1, further comprising:

performing a rekey operation when a predefined period of time has lapsed or a predefined number of messages been transmitted from the source data transport manager to the target data transport manager since the symmetric keys were derived, the rekey operation including:

executing another handshake operation of the first-type communication connection between the source data transport daemon of the source host computer in the distributed storage system and the target data transport daemon of the target host computer in the distributed storage system that results in a new symmetric key at each of the source and target data transport daemons;

sending the new symmetric key of the source data transport daemon from the source data transport daemon to the source data transport manager of the source host computer; and sending the new symmetric key of the target data transport daemon from the target data transport daemon to the target data transport manager of the target host computer, wherein the new symmetric keys of the source and target data transport managers are used to encrypt and decrypt subsequent storage-related messages transmitted from the source data transport manager to the target data transport manager through new second-type communication connections between the source and target data transport managers.

9. A non-transitory computer-readable storage medium containing program instructions for transmitting storage-related messages between host computers in a distributed storage system, wherein execution of the program instructions by one or more processors of a computer system causes the one or more processors to perform steps comprising:

executing a handshake operation of a first-type communication connection between a source data transport daemon of a source host computer in the distributed storage system and a target data transport daemon of a target host computer in the distributed storage system that results in a symmetric key at each of the source and target data transport daemons;

sending the symmetric key of the source data transport daemon from the source data transport daemon to a source data transport manager of the source host computer;

sending the symmetric key of the target data transport daemon from the target data transport daemon to a target data transport manager of the target host computer;

transmitting storage-related message from the source data transport manager to the target data transport manager through a second-type communication connection between the source and target data transport managers, wherein the storage-related message is encrypted and decrypted using the symmetric keys at the source and target data transport managers; and transmitting additional storage-related messages from the source data transport manager to the target data transport manager through additional second-type communication connections, wherein the additional storage-related messages are again encrypted and decrypted using the same symmetric keys at the source and target data transport managers.

10. The computer-readable storage medium of claim 9, wherein the first-type communication connection between the source and target data transport daemons is a Transport Layer Security (TLS) connection.

11. The computer-readable storage medium of claim 10, wherein the second-type communication connection between the source and target data transport managers is a Transmission Control Protocol (TCP) connection or a remote direct memory access (RDMA) connection.

12. The computer-readable storage medium of claim 9, wherein the source and target data transport daemons are running in a user space of their respective host computers and the source and target data transport managers are running in a kernel space of their respective host computers.

13. The computer-readable storage medium of claim 9, wherein the steps further comprise:

adding a replay count in a header of the message at the source data transport manager, wherein the replay count is equal to a replay count of a previous message sent from the source data transport manager to the target data transport manager plus a predefined value.

14. The computer-readable storage medium of claim 13, wherein the steps further comprise:
  computing a media authentication code (MAC) at the source data transport manager based on at least the replay count of the message using the symmetric key of the source data transport manager and adding the MAC in the header of the message; and
  verifying the MAC in the message at the target data transport manager by comparing the MAC with a verification MAC that is computed based on at least the replay count of the message using the symmetric key of the target data transport manager.

15. The computer-readable storage medium of claim 13, wherein the steps further comprise:
  when the message is received at the target data transport manager, using the replay count of the message and a previous replay count of a previous message received from the source data transport manager to determine whether to process the received message as a valid message, an invalid message or a duplicate message.

16. The computer-readable storage medium of claim 9, wherein the steps further comprise:
  performing a rekey operation when a predefined period of time has lapsed or a predefined number of messages been transmitted from the source data transport manager to the target data transport manager since the symmetric keys were derived, the rekey operation including:
    executing another handshake operation of the first-type communication connection between the source data transport daemon of the source host computer in the distributed storage system and the target data transport daemon of the target host computer in the distributed storage system that results in a new symmetric key at each of the source and target data transport daemons;
  sending the new symmetric key of the source data transport daemon from the source data transport daemon to the source data transport manager of the source host computer; and
  sending the new symmetric key of the target data transport daemon from the target data transport daemon to the target data transport manager of the target host computer,
  wherein the new symmetric keys of the source and target data transport managers are used to encrypt and decrypt subsequent storage-related messages transmitted from the source data transport manager to the target data transport manager through additional second-type communication connections between the source and target data transport managers.

17. A distributed storage system implemented using at least one hardware processors and a memory comprising: a source host computer that includes a source data transport daemon and a source data transport manager; and a target host computer that includes a target data transport daemon and a target data transport manager, wherein the source and target data transport daemons are configured to execute a handshake operation of a first-type communication connection between the source data transport daemon and the target data transport daemon that results in a symmetric key at each of the source and target data transport daemons, wherein the source data transport daemon is configured to send the symmetric key of the source data transport daemon from the source data transport daemon to the source data transport manager of the source host computer, wherein the target data transport daemon is configured to send the symmetric key of the target data transport daemon from the target data transport daemon to the target data transport manager, and wherein the source data transport manager is configured to encrypt storage-related messages transmitted through multiple second-type communications connection from the source data transport manager to the target data transport manager using the symmetric key of the source data transport manager, wherein the target data transport manager is configured to decrypt the storage-related messages transmitted through the multiple second-type communication connections from the source data transport manager to the target data transport manager using the symmetric key of the target data transport manager.

18. The distributed storage system of claim 17, wherein the first-type communication connection between the source and target data transport daemons is a Transport Layer Security (TLS) connection.

19. The distributed storage system of claim 17, wherein the second-type communication connection between the source and target data transport managers is a Transmission Control Protocol (TCP) connection or a remote direct memory access (RDMA) connection.

20. The distributed storage system of claim 17, wherein the source and target data transport daemons are running in a user space of their respective host computers and the source and target data transport managers are running in a kernel space of their respective host computers.

* * * * *